(12) United States Patent
Oyanagi et al.

(10) Patent No.: US 8,313,572 B2
(45) Date of Patent: *Nov. 20, 2012

(54) METALLIC PIGMENT, PIGMENT DISPERSION LIQUID, METALLIC PIGMENT INK COMPOSITION, AND INK JET RECORDING METHOD

(75) Inventors: Takashi Oyanagi, Matsumoto (JP); Keitaro Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

This patent is subject to a terminal disclaimer.

(21) Appl. No.: 11/886,752

(22) PCT Filed: Mar. 17, 2006

(86) PCT No.: PCT/JP2006/305420
§ 371 (c)(1),
(2), (4) Date: Dec. 9, 2008

(87) PCT Pub. No.: WO2006/101054
PCT Pub. Date: Sep. 28, 2006

(65) Prior Publication Data
US 2009/0214833 A1 Aug. 27, 2009

(30) Foreign Application Priority Data

Mar. 22, 2005 (JP) ................................. 2005-081623
Jul. 15, 2005 (JP) ................................. 2005-207395
Dec. 21, 2005 (JP) ................................. 2005-368863

(51) Int. Cl.
*C09D 11/02* (2006.01)
*G01D 11/00* (2006.01)

(52) U.S. Cl. ..................................... 106/31.86; 347/100

(58) Field of Classification Search ............... 106/31.86; 347/100
See application file for complete search history.

(56) References Cited

U.S. PATENT DOCUMENTS

| | | | |
|---|---|---|---|
| 5,277,711 A * | 1/1994 | Schmidt et al. ............... | 106/404 |
| 6,019,834 A * | 2/2000 | Hayashi et al. ............... | 106/499 |
| 6,287,695 B1 | 9/2001 | Kaupp et al. | |
| 6,827,433 B2 | 12/2004 | Takemoto et al. | |
| 7,156,909 B2 | 1/2007 | Oyanagi et al. | |
| 7,201,795 B2 | 4/2007 | Takemoto et al. | |
| 7,303,619 B2 | 12/2007 | Oyanagi | |
| 7,374,609 B2 | 5/2008 | Bujard et al. | |
| 7,417,074 B2 | 8/2008 | Hiroki et al. | |
| 7,513,945 B2 * | 4/2009 | Nakano et al. ............... | 106/31.6 |
| 7,837,777 B2 * | 11/2010 | Ikeya et al. ............... | 106/31.75 |
| 2001/0007696 A1 | 7/2001 | Kaupp et al. | |
| 2004/0194663 A1 * | 10/2004 | Li et al. ............... | 106/403 |
| 2004/0250731 A1 * | 12/2004 | Nagano et al. ............... | 106/404 |

FOREIGN PATENT DOCUMENTS

| | | |
|---|---|---|
| EP | 96/17025 | 12/1994 |
| EP | 1367101 A1 * | 12/2003 |
| EP | 2005-075941 | 3/2005 |
| EP | 2005/049745 A1 | 6/2005 |
| EP | 2005/111152 A1 | 11/2005 |
| JP | 4-173879 | 6/1992 |
| JP | 11-323223 | 11/1999 |
| JP | 11-343436 | 12/1999 |
| JP | 2001-081363 A | 3/2001 |
| JP | 2003-026970 A | 1/2003 |
| JP | 2003-253166 A | 9/2003 |
| JP | 2004-315740 A | 11/2004 |
| JP | 2005-36079 | 2/2005 |
| JP | 2005-68250 | 3/2005 |
| JP | 2005-68251 | 3/2005 |
| JP | 2005-068252 A | 3/2005 |
| JP | 2005-081816 A | 3/2005 |
| WO | 02/055619 A | 7/2002 |
| WO | 2004/046254 A | 6/2004 |

OTHER PUBLICATIONS

English Machine Translation of JP 2005-036079.*
English Machine Translation of JP 2005-068251.*
English Machine Translation of JP2005-068250.*
English Machine Translation of JP 11-343436.*
English Machine Translation of JP 11-323223.*
English Abstract of Japanese Application 2005-068252A Published Mar. 17, 2005.
English Abstract of Japanese Application 2005-081816A Published Mar. 31, 2005.
English Abstract of Japanese Application 2003-026970A Published Jan. 29, 2003.
European Search Report Application 06729409.0 Issued Apr. 4, 2011.
Machine Translation of Japanese Application 4-173879 Published Jun. 22, 1992.
English Abstract of Japanese Application 2005-075941 Published Mar. 24, 2005.

* cited by examiner

*Primary Examiner* — Melvin C Mayes
*Assistant Examiner* — Veronica F Faison

(57) ABSTRACT

This invention provides a metallic pigment, which can prepare a printed matter having metallic luster, can realize stable printing even in a printer with ink jet nozzles having a nozzle diameter of not more than 30 μm, can eliminate the need to carry out heat treatment and the like, and, thus, can realize ink jet recording without undergoing a limitation on printing media (recording media), an ink composition, and an ink jet recording method. The metallic pigment is a metal foil piece having an average thickness of 30 to 100 μm, having a 50% average particle diameter of not less than 0.5 μm and not more than 4.0 μm, and having such a particle size distribution that the maximum particle diameter is not more than 12 μm. An ink composition containing this metallic pigment and an ink jet head having a nozzle diameter of not more than 30 μm are provided, and the ratio between the average particle diameter of the metallic pigment and the nozzle diameter of the ink jet head (average particle diameter/nozzle diameter) is preferably brought to not more than 0.15.

18 Claims, No Drawings

METALLIC PIGMENT, PIGMENT DISPERSION LIQUID, METALLIC PIGMENT INK COMPOSITION, AND INK JET RECORDING METHOD

TECHNICAL FIELD

The present invention relates to a metallic pigment, a pigment dispersion, a metallic pigment ink composition and an ink jet recording method, and more particularly to a metallic pigment, a pigment dispersion, a metallic pigment ink composition and an ink jet recording method which make it possible to prepare printed matter having metallic luster, make it possible to stably print even by a printer using ink jet nozzles having a nozzle diameter of 30 μm or less, and make ink jet recording possible without limitation of printing media (recording media), because heat treatment and the like are unnecessary.

BACKGROUND ART

In order to reproduce metallic luster on printed matter, there has hitherto been used a print ink containing a pigment comprising a metal such as aluminum, metal, silver or brass or an alloy thereof, or containing a pearl pigment, or used a transfer foil by an adhesive or heat fusion.

Further, by recent development of ink jet printing technology, a demand for obtaining printed matter having metallic luster has increased also in ink jet printing.

On the other hand, aluminum pigments presently commercially available as use for metallic pigments have an average particle size of 10 μm or more (for example, see patent documents 1 and 2), so that it is extremely difficult to allow them to pass through fine nozzles (30 μm or less in diameter) of a printer or a filtering filter. Further, these aluminum pigments have a disadvantage that it is difficult to obtain specular gloss because of their excessively large particle size. In addition, the aluminum pigments come to react with the surrounding moisture when reduced in particle size. It is therefore extremely difficult to reduce the particle size to 1 μm or less by a conventional pulverizing method or atomizing method. Accordingly, a pigment having an average particle size of 200 nm or less, which is ordinarily used in an ink jet ink, can not be prepared.

On the other hand, there is a method of forming a thin metal film on a base material by using a noble metal colloid of gold, silver or the like. However, metal colloidal particles having an average particle size of tens of nanometers can not reproduce metallic luster. For example, stable gold colloidal particles have a particle size of about 10 to 20 nm, and the color of a colloid dispersion is purple in this state. In this case, in order to obtain a thin film of gold, it is necessary to heat at 150° C. or more. Further, it is also possible to stably disperse a gold colloid having a larger particle size by adding a protective colloid. However, in this case, no thin metal film is obtained unless treatment for decomposing and removing the protective colloid is conducted. From these reasons, in the method in which the metal colloid is used, after-treatment of some kind becomes necessary after printing. In particular, when heat treatment is conducted, there is a disadvantage that a print medium is extremely limited. Also when pressure treatment is conducted, there naturally occur a disadvantage that a print medium is limited and an equipment load of requiring pressure equipment (for example, see patent document 3). Further, although noble metals (Au, Ag, Ru, Rh, Pd, Os, Ir and Pt) are used as the metal colloids, it is difficult to use them in decoration, ornament, advertising printing and the like in terms of cost.

[Patent Document 1] U.S. Pat. No. 4,233,195
[Patent Document 2] U.S. Pat. No. 5,662,738
[Patent Document 3] JP-A-2004-175832

DISCLOSURE OF THE INVENTION

Problems to be Solved by the Invention

It is therefore an object of the invention to provide a metallic pigment, a pigment dispersion, a metallic pigment ink composition and an ink jet recording method which solve the above-mentioned problems of the conventional art, make it possible to prepare printed matter having metallic luster, make it possible to stably print even by a printer using ink jet nozzles having a nozzle diameter of 30 μm or less, and make ink jet recording possible without limitation of printing media (recording media), because heat treatment and the like are unnecessary.

Means for Solving the Problem

The present inventors have found that print stability and glossiness of recorded matter are improved by limiting a factor relating to the average particle size of a metallic pigment using metal foil pieces which is allowed to be contained in an ink composition and the maximum particle size in particle size distribution to specific ranges, thus accomplishing the invention.

That is to say, the invention has been achieved by the following constitutions:

(1) A metallic pigment which is metal foil pieces having an average thickness of 30 to 100 nm and a 50% average particle size of 1.0 μm to 4.0 μm, and having a maximum particle size of 12 μm or less in the particle size distribution;

(2) The metallic pigment of the above (1), wherein the above-mentioned metal foil pieces are ones obtained by separating a metal or metal compound layer of a pigment original having a structure in which a release resin layer and the metal or metal compound layer are sequentially laminated on a sheet-shaped base material, from the sheet-shaped base material at an interface between the metal or metal compound layer and the sheet-shaped base material as a boundary, followed by pulverization;

(3) The metallic pigment of the above (2), wherein the above-mentioned metal or metal compound layer is one prepared by a vacuum deposition method;

(4) The metallic pigment of the above (2), wherein the above-mentioned pulverizing treatment and dispersing treatment are performed by a method using no medium;

(5) The metallic pigment of the above (4), wherein the above-mentioned pulverizing treatment and dispersing treatment are performed by using any one or more of ultrasonic dispersion, a jet mill and a colloid mill;

(6) The metallic pigment of the above (4) or (5), wherein classifying treatment is performed after the above-mentioned pulverizing treatment and dispersing treatment;

(7) The metallic pigment of the above (6), wherein the above-mentioned classifying treatment is performed by centrifugal classification, sedimentation classification or screen classification;

(8) A pigment dispersion containing the metallic pigment of any one of the above (1) to (7);

(9) The pigment dispersion of the above (8), which further contains a release resin dissolved and an alkylene glycol ether;

(10) The pigment dispersion of the above (9), wherein the above-mentioned release resin is polyvinyl butyral or cellulose acetate butyrate;

(11) The pigment dispersion of any one of the above (8) to (10), wherein the above-mentioned alkylene glycol ether is liquid under normal temperature and pressure, the alkylene group is an ethylene group or propylene group of 2 to 4 repeating units, and the ether group is a monoether and/or a diether;

(12) An metallic pigment ink composition which is prepared using at least the metallic dispersion of any one of the above (8) to (10);

(13) The metallic pigment ink composition of the above (12), which is prepared further using an organic solvent;

(14) The metallic pigment ink composition of the above (13), wherein the above-mentioned organic solvent is liquid under normal temperature and pressure, the alkylene group of the alkylene glycol ether is an ethylene group or propylene group of 2 to 4 repeating units, the ether group is a mixture of a monoether and/or a diether, and an acrylic polyol resin is contained as a fixing resin;

(15) The metallic pigment ink composition of the above (14), wherein the above-mentioned organic solvent comprises diethylene glycol diethyl ether and dipropylene glycol monomethyl ether;

(16) The metallic pigment ink composition of the above (15), wherein the mixing ratio of the above-mentioned organic solvent ranges from 20:80 to 80:20;

(17) The metallic pigment ink composition of the above (16), which contains a silicone-based surfactant, a polyoxyethylene-based surfactant or an acetylenediol-based surfactant;

(18) The metallic pigment ink composition of the above (17), which further contains polyvinyl butyral and/or cellulose acetate butyrate;

(19) An ink jet recording method comprising using the metallic pigment ink composition of any one of the above (12) to (18) and an ink jet head having a nozzle diameter of 30 μm or less;

(20) The ink jet recording method of the above (19), wherein the ratio of the 50% average particle size of the above-mentioned metallic pigment and the nozzle diameter of the ink jet head (average particle size/nozzle diameter) is 0.15 or less; and

(21) Printed matter which is obtained by the ink jet recording method of the above (20).

According to the metallic pigment, pigment dispersion, metallic pigment ink composition and ink jet recording method of the invention, it is possible to prepare printed matter having metallic luster, it is possible to stably print even by a printer using ink jet nozzles having a nozzle diameter of 30 μm or less, and ink jet recording has been made possible without limitation of printing media (recording media), because heat treatment and the like are unnecessary.

BEST MODE FOR CARRYING OUT THE INVENTION

The metallic pigment, pigment dispersion, metallic pigment ink composition and ink jet recording method of the invention will be described in detail below.

The metallic pigment of the invention is metal foil pieces having an average thickness of 30 to 100 nm and a 50% average particle size of 1.0 μm to 4.0 μm, and having a maximum particle size of 12 μm or less in particle size distribution.

The metallic pigment of the invention has the above-mentioned average particle size and factor relating to the particle size distribution, which makes it possible to prepare printed matter having metallic luster, and makes it possible to stably print even by a printer using ink jet nozzles having a nozzle diameter of 30 μm or less.

In order to obtain metallic luster by a conventional type metallic pigment, the pigment is required to have an average particle size of 10 μm or more. In general, however, the average particle size is 20 μm or more, and the maximum particle size in particle size distribution exceeds 30 μm. In this case, the pigment can not be used in an ink jet printer using ink jet nozzles having a nozzle diameter of 30 μm or less.

Further, it is preferred that the metallic pigment of the invention has a maximum particle size in particle size distribution of 10 μm or less. In particular, when ink jet nozzles having a diameter of 20 μm are used, the maximum particle size in particle size distribution is required to be 10 μm or less. Further, when stable printing is performed using ink jet nozzles having a diameter of 20 μm, the maximum particle size in particle size distribution is required to be 4.0 μm or less.

The metallic pigment of the invention is not particularly limited, as long as the metal foil pieces are used and the above-mentioned average particle size and requirement relating to the particle size distribution. Examples thereof include one obtained by separating a metal or metal compound layer of a composite pigment original having a structure in which a release resin layer and the metal or metal compound layer are sequentially laminated on a sheet-shaped base material surface, from the sheet-shaped base material at an interface between the metal or metal compound layer and the sheet-shaped base material as a boundary, followed by pulverization.

A metal or a metal compound used in the metal or metal compound layer of the composite pigment original for producing the metallic pigment of the invention is not particularly limited, as long as it has a function such as metallic luster. Aluminum, silver, gold, nickel, chromium, tin, zinc, indium, titanium, copper or the like is used, and at least one kind of a metal element and metal compound thereof or an alloy thereof and a mixture thereof is used.

The above-mentioned metal or metal compound layer is preferably formed by vacuum deposition, ion plating or a sputtering method. The thickness of these metal or metal compound layers is not particularly limited, but it is preferably within the range of 30 to 100 nm. Less than 30 nm results in poor reflecting properties and brightness to cause a decrease in performance as the metallic pigment, whereas exceeding 100 nm results in an increase in apparent specific gravity to cause a reduction in dispersion stability of the metallic pigment. An unnecessary increase of the metal or metal compound layer only causes sedimentation due to an increase in weight of particles. Even when the film thickness is thicker than this, reflecting properties and brightness do not change so much.

The release resin layer in the composite pigment original for producing the metallic pigment of the invention is an undercoat layer for the above-mentioned metal or metal compound layer, and a release layer for improving releasability from the sheet-shaped base material surface. The resin used in this release resin layer is not particularly limited, but preferably used is polyvinyl alcohol, polyvinyl butyral, polyacrylic acid, polyacrylamide, a cellulose derivative, polyvinyl butyral, an acrylic copolymer or a modified nylon resin.

A solution of one or a mixture of two or more kinds of the above-mentioned resins is applied, and drying and the like are performed to form the layer. An additive such as a viscosity controlling agent can be allowed to be contained in this coating solution.

As for the coating of the release resin layer, it is formed by conventionally used gravure coating, roll coating, blade coating, extrusion coating, dip coating, spin coating or the like. After coating and drying, surface smoothing is performed by calendering treatment as needed.

Although the thickness of the release resin layer is not particularly limited, it is preferably from 0.5 to 50 µm, and more preferably from 1 to 10 µm. Less than 0.5 µm results in an insufficient amount as a dispersing resin, whereas exceeding 50 µm results in easy separation at an interface with the pigment layer when roll forming is performed.

The sheet-shaped base materials in the composite pigment original for producing the metallic pigment of the invention include but are not limited to release films such as a polyester film such as polytetrafluoroethylene, polyethylene, polypropylene or polyethylene terephthalate, a polyamide film such as nylon 66 or nylon 6, a polycarbonate film, a triacetate film and a polyimide film.

The preferred sheet-shaped base material is polyethylene terephthalate or a copolymer thereof.

Although the thickness of these sheet-shaped base materials is not particularly limited, it is preferably from 10 to 150 µm. Ten micrometers or more causes no problem with regard to handling properties in procedures, whereas 150 µm or less results in rich elasticity to cause no problem with regard to roll forming and separation.

Further, the above-mentioned metal or metal compound layer may be hold between protective layers. The protective layers include a silicon oxide layer and a resin layer for protection.

The silicon oxide layer is not particularly limited as long as it is a layer containing silicon oxide. However, it is preferably formed from a silicon alkoxide such as tetraalkoxysilane or a polymer thereof by a sol-gel method.

An alcohol solution in which the above-mentioned silicon alkoxide or polymer thereof is dissolved is applied, and thermal burning is performed, thereby forming a coating film of the silicon oxide layer.

The resin layer for protection is not particularly limited as long as it is a resin which is insoluble in a dispersing medium. Examples thereof include polyvinyl alcohol, polyethylene glycol, polyacrylic acid, poly-acrylamide, a cellulose derivative and the like. However, it is preferably formed from polyvinyl alcohol or a cellulose derivative.

An aqueous solution of one or a mixture of two or more kinds of the above-mentioned resins is applied, and drying and the like are performed to form the layer. An additive such as a viscosity controlling agent can be allowed to be contained in this coating solution.

The above-mentioned coating of silicon oxide and the resin is performed by the same technique as in the above-mentioned coating of the resin layer for protection.

Although the thickness of the above-mentioned protective layer is not particularly limited, it is preferably within the range of 50 to 150 nm. Less than 50 nm results in deficient mechanical strength, whereas exceeding 150 nm results in excessively high strength, which causes the difficulty of pulverization and dispersion, and separation at an interface with the metal or metal compound layer in some cases.

Further, a coloring material layer may be provided between the above-mentioned "protective layer" and "metal or metal compound layer".

The coloring material layer is one introduced in order to obtain an arbitrary coloring pigment, and is not particularly limited as long as it can contain a coloring material which can impart any color tone and hue, in addition to metallic luster and brightness of the metallic pigment used in the invention. The coloring material used in this coloring material layer may be either a dye or a pigment. Further, as the dye and pigment, known ones can be appropriately used.

In this case, the "pigment" used in the coloring material layer means a natural pigment, a synthetic organic pigment, a synthetic inorganic pigment or the like which is defined in the field of general pigment chemistry, and differs from one fabricated to the laminated structure of the "composite pigment" or the like of the invention.

Although a method for forming this coloring material layer is not particularly limited, it is preferred to form it by coating.

Further, when the coloring material used in the coloring material layer is the pigment, it is preferred to further contain a resin for coloring material dispersion. As the resin for coloring material dispersion, preferred is polyvinyl butyral, an acrylic acid copolymer or the like. In this case, the coloring material layer is preferably prepared as a resin thin film by dispersing or dissolving the pigment, the resin for coloring material dispersion and optionally another additive and the like in a solvent to prepare a solution, and forming a uniform liquid film therefrom by spin coat, followed by drying.

In the production of the composite pigment original for producing the metallic pigment of the invention, it is preferred in terms of operating efficiency that both the above-mentioned coloring material layer and protective layer are formed by coating.

As the composite pigment original for producing the metallic pigment of the invention, a layer constitution having a plurality of sequentially laminated structures of the above-mentioned release resin layer and metal or metal compound layer is also possible. In that case, the thickness of the whole plurality of laminated structures comprising the metal or metal compound layers, that is to say, the thickness of the metal or metal compound layer-release resin layer-metal or metal compound layer-release resin layer-metal or metal compound layer excluding the sheet-shaped base material and the release resin layer provided just thereon, is preferably 5000 nm or less. In the case of 5000 nm or less, cracking and separation are difficult to occur even when the composite pigment original is rolled up in roll form, so that it is excellent in keeping quality. Further, when formed into the pigment, it is excellent in brightness, so that it is preferred.

Furthermore, they also include but are not limited to a structure in which the release resin layer and the metal or metal compound layer are sequentially laminated on both sides of the sheet-shaped base material.

The metallic pigment of the invention can be obtained by separating the metal or metal compound layer of the above-mentioned composite pigment original from the above-mentioned sheet-shaped base material at the release resin layer as a boundary, followed by pulverization for miniaturization.

Although a separation, pulverization and dispersing treatment method is not particularly limited, a method using no medium is preferred. Specific examples thereof include a method performed by immersing the above-mentioned composite pigment original in a liquid and a method using at least any one of ultrasonic dispersion, a jet mill and a colloid mill.

The ultrasonic treatment is specifically a method of immersing the above-mentioned composite pigment original in a liquid and concurrently performing ultrasonic treatment to carry out separation treatment and pulverizing treatment of the composite pigment separated. This treatment is preferred.

Further, in order to obtain specified particle size characteristics in the metallic pigment of the invention, it is preferred that classifying treatment is performed after the above-mentioned pulverizing treatment and dispersing treatment. A technique for the classifying treatment is not particularly limited, but includes centrifugal classification, sedimentation classification, screen classification and the like.

In the metallic pigment obtained as described above, the release resin layer has a role as a protective colloid, and it is possible to obtain a stable dispersion by only performing the dispersing treatment in the solvent. Further, in the ink composition using the metallic pigment, the resin derived from the above-mentioned release resin layer also carries a function of imparting adhesiveness to a recording medium such as paper.

Furthermore, in order to obtain specified particle size characteristics in the metallic pigment of the invention, it is preferred that classifying treatment is performed after the above-mentioned pulverizing treatment and dispersing treatment. A technique for the classifying treatment is not particularly limited, but includes centrifugal classification, sedimentation classification, screen classification and the like.

The metallic pigment of the invention is dispersed and allowed to be contained in a suitable liquid medium to form a pigment dispersion and a metallic pigment ink composition.

The liquid medium used in the pigment dispersion and metallic pigment ink composition using the metallic pigment of the invention (hereinafter also collectively simply referred to as the "ink composition of the invention") may be either an aqueous one or an organic one.

As the organic liquid medium, there can be preferably used a polar organic solvent, for example, an alcohol (for example, methyl alcohol, ethyl alcohol, propyl alcohol, butyl alcohol, isopropyl alcohol, fluorinated alcohol or the like), a ketone (for example, acetone, methyl ethyl ketone, cyclohexanone or the like), a carboxylic acid ester (for example, methyl acetate, ethyl acetate, propyl acetate, butyl acetate, methyl propionate, ethyl propionate or the like), an ether (for example, diethyl ether, dipropyl ether, tetrahydrofuran, dioxane or the like) or the like.

In addition, preferred organic solvents include one containing a mixture of a diethylene glycol compound which is liquid under normal temperature and pressure and a dipropylene glycol compound which is liquid under normal temperature and pressure at a weight mixing ratio of 20:80 to 80:20, as described in PCT International Publication Pamphlet 2002/055619, and the like.

As the above-mentioned diethylene glycol compound, there can be used, for example, a diethylene glycol compound represented by general formula (I):

[Chemical Formula 1]

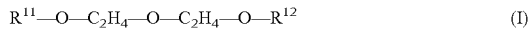

$$R^{11}\text{—}O\text{—}C_2H_4\text{—}O\text{—}C_2H_4\text{—}O\text{—}R^{12} \quad (I)$$

wherein $R^{11}$ and $R^{12}$ are each independently a hydrogen atom, an alkyl group having 1 to 4 carbon atoms or an $R^{13}CO$ group, and $R^{13}$ is an alkyl group having 1 to 4 carbon atoms. As the above-mentioned dipropylene glycol compound, there can be used, for example, a dipropylene glycol compound represented by general formula (II):

[Chemical Formula 2]

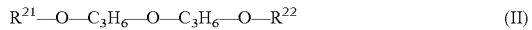

$$R^{21}\text{—}O\text{—}C_3H_6\text{—}O\text{—}C_3H_6\text{—}O\text{—}R^{22} \quad (II)$$

wherein $R^{21}$ and $R^{22}$ are each independently a hydrogen atom, an alkyl group having 1 to 4 carbon atoms or an $R^{23}CO$ group, and $R^{23}$ is an alkyl group having 1 to 4 carbon atoms.

In this specification, the "alkyl group having 1 to carbon atoms" can be a straight-chain or branched alkyl group, for example, a methyl group, an ethyl group, a n-propyl group, an iso-propyl group, a n-butyl group, an iso-butyl group or a tert-butyl group.

The boiling pints of the above-mentioned diethylene glycol compound and the above-mentioned dipropylene glycol compound which can be used in the organic solvent are each preferably 150° C. or more, and more preferably 180° C. or more, under normal pressure. Moreover, the vapor pressures at 20° C. of the above-mentioned diethylene glycol compound and the above-mentioned dipropylene glycol compound which can be used in the organic solvent are preferably 1 hPa or less, and more preferably 0.7 hPa or less. The use of the above-mentioned diethylene glycol compound and the above-mentioned dipropylene glycol compound which satisfy the high boiling point and low vapor pressure conditions reduce the burden of providing local exhaust equipment or exhaust gas treating equipment, makes it possible to improve working conditions, and also makes it possible to reduce the environmental burden to circumferential environment.

Preferred examples of the above-mentioned diethylene glycol compounds which can be used in the organic solvent include diethylene glycol; a diethylene glycol ether (particularly an alkyl ether), for example, diethylene glycol monomethyl ether, diethylene glycol dimethyl ether, diethylene glycol methyl ethyl ether, diethylene glycol monoethyl ether, diethylene glycol diethyl ether, diethylene glycol mono-n-butyl ether or diethylene glycol di-n-butyl ether; or a diethylene glycol ester, for example, diethylene glycol monoethyl ether acetate, diethylene glycol mono-n-butyl ether acetate or diethylene glycol monoacetate. Of these, diethylene glycol, diethylene glycol monomethyl ether, diethylene glycol monoethyl ether, diethylene glycol diethyl ether, diethylene glycol mono-n-butyl ether, diethylene glycol di-n-butyl ether, diethylene glycol monoethyl ether acetate or diethylene glycol monobutyl ether acetate is preferred.

Further, preferred examples of the above-mentioned dipropylene glycol compounds which can be used in the organic solvent include dipropylene glycol; or dipropylene glycol ether (particularly an alkyl ether), for example, dipropylene glycol monomethyl ether or dipropylene glycol monoethyl ether.

In the organic solvent, the mixing ratio (weight ratio) of the above-mentioned diethylene glycol compound and the above-mentioned dipropylene glycol compound is within the range of 20:80 to 80:20, and preferably within the range of 30:70 to 70:30. When the mixing ratio departs from the range of 20:80 to 80:20, print stability is impaired, or keeping stability is deteriorated, in some cases.

In addition to the mixture of the above-mentioned diethylene glycol compound and the above-mentioned dipropylene glycol compound, the organic solvent can further contain as an organic solvent a polyethylene glycol monoether compound which is liquid under normal temperature and pressure and represented by general formula (III):

[Chemical Formula 3]

$$R^{31}\text{—}O\text{—}(C_2H_4\text{—}O)_n\text{—}H \quad (III)$$

wherein $R^{31}$ is an alkyl group having 1 to 6 carbon atoms (preferably an alkyl group having 1 to 4 carbon atoms), and n is an integer of 3 to 6.

In this specification, the "alkyl group having 1 to 4 carbon atoms" can be a straight-chain or branched alkyl group, for example, a straight-chain or branched pentyl group or a straight-chain or branched hexyl group, in addition to the above-mentioned "alkyl group having 1 to 4 carbon atoms".

The boiling point of the above-mentioned polyethylene glycol monoether compound which can be used in the organic solvent is preferably 200° C. or more, and more preferably 250° C. or more, under normal pressure. Further, the flash point of the above-mentioned polyethylene glycol monoether compound which can be used in the organic solvent is preferably 100° C. or more, and more preferably 130° C. or more. The use of such a polyethylene glycol monoether compound makes it possible to impart volatilization inhibiting properties to an oil-based ink composition using the organic solvent. For example, it becomes possible to improve print stability by inhibiting solvent evaporation at a nozzle surface of a printer head.

Preferred examples of the above-mentioned polyethylene glycol monoether compounds include a triethylene glycol monoether compound (for example, triethylene glycol monomethyl ether or triethylene glycol monobutyl ether), or a mixture of polyethylene glycol monoether compounds in which n is from 4 to 6 in the above-mentioned general formula (III) (particularly polyethylene glycol monomethyl ether), for example, a mixture of tetraethylene glycol monomethyl ether, pentaethylene glycol monomethyl ether and hexaethylene glycol monomethyl ether.

When the organic solvent contains the above-mentioned polyethylene glycol monoether compound in addition to the above-mentioned diethylene glycol compound and the above-mentioned polyethylene glycol monoether, it is preferred that the above-mentioned polyethylene glycol monoether compound is contained in a proportion of 10 to 30 parts by weight based on 30 to 50 parts by weight of the above-mentioned diethylene glycol compound and 30 to 50 parts by weight of the above-mentioned dipropylene glycol compound. When the proportion of the content of the above-mentioned polyethylene glycol monoether compound becomes less than 10 parts by weight, sufficient volatilization inhibiting properties can not be imparted to the ink composition. On the other hand, exceeding 30 parts by weight unfavorably results in a relative decrease in the contents of the above-mentioned diethylene glycol compound and the above-mentioned dipropylene glycol compound.

When the organic liquid medium is used, a polyoxyethylene derivative of a nonionic surfactant or a silicone-based surfactant is preferably contained.

As the above-mentioned polyoxyethylene derivative, an acetylenediol-based surfactant can be used. The acetylenediol-based surfactant may have a polyoxyalkylene structure. Specific examples of the acetylenediol-based surfactants include Surfynol 104, 82, 465, 485 or TG (all are available from Air Products and Chemicals, Inc.) and Olfin STG and Olfin E1010 (both are names of products manufactured by Nissin Chemical Industry Co., Ltd.).

Further, as the above-mentioned polyoxyethylene derivative, it is also possible to utilize another commercial product. Specific examples thereof include Nissan Nonion A-10R and A-13R (NOF Corporation), Flowlen TG-740W and D-90 (Kyoeisha Chemical Co., Ltd.), Emulgen A-90 and A-60 (Kao Corporation) or Noigen CX-100 (Dai-ichi Kogyo Seiyaku Co., Ltd.).

The silicone-based surfactants include, for example, dimethylsiloxane, polyether-modified polydimethylsiloxane, methylstyrene-modified polydimethylsiloxane, olefin-modified polydimethylsiloxane, alcohol-modified poly-dimethylsiloxane, alkyl-modified polydimethylsiloxane, polyester-modified polydimethylsiloxane, methacrylic-modified polydimethylsiloxane and amino-modified polydimethylsiloxane.

Further, there can be used ones available under the trade names of BYK-307, 331, 333, 347, 348, UV-3500, UV-3510, UV-3530 and UV-3570 (manufactured by BYK-Chemie Japan KK) and KF-860, 8005, 6004, 351, 353, 354L, 355A, 615A, 618, 6011, 6015, X-22-2426, 164C and 2404 (manufactured by Shin-Etsu Chemical Co., Ltd.).

When the organic liquid medium is used, the content of the nonionic surfactant can be appropriately selected in the ink composition of the invention. However, it is preferably from 0.01 to 10% by weight, and more preferably from 0.05 to 3.0% by weight, based on the content of the pigment in the ink composition.

When the organic liquid medium is used, the ink composition of the invention preferably contains a fixing resin (binder resin).

As the binder resin, there can be used, for example, an acrylic resin, an acrylic polyol resin, a styrene-acrylic resin, a rosin-modified resin, a phenol resin, a terpene-based resin, a polyester resin, a polyamide resin, an epoxy resin, a vinyl chloride-vinyl acetate copolymer, a cellulose-based resin (for example, cellulose acetate butyrate), vinyltoluene-α-methylstyrene copolymer, polyvinyl butyral, cellulose acetate butyrate or the like. In addition, the binder resin can also improve fixability of the pigment to a recording medium depending on the amount thereof added. The binder resin can adjust the viscosity of the ink composition of the invention. The viscosity (viscosity at a temperature of 20° C.) of the ink composition of the invention is, for example, 10 mPa·s, and more preferably 5 mPa·s.

Further, the ink composition of the invention can contain another additive contained in a conventional ink composition. Such additives include, for example, a stabilizer (for example, an antioxidant or an ultraviolet absorber). As the antioxidant, there can be used, for example, BHA (2,3-butyl-4-oxyanisole) or BHT (2,6-di-t-butyl-p-cresol). As the ultraviolet absorber, there can be used, for example, a benzophenone-based compound or a benzotriazole-based compound. Furthermore, as the surfactant, there can be used all of the anionic, cationic, amphoteric and nonionic surfactants.

A glycol ether may be contained in the metallic pigment-containing ink composition of the invention.

The glycol ether contained in the ink composition of the invention includes an ethylene glycol-based ether and propylene glycol-based ether which are based on each of aliphatic groups of methyl, n-propyl, i-propyl, n-butyl, i-butyl, hexyl and 2-ethylhexyl, double-bond containing allyl groups and phenyl groups. They are colorless and have a little odor, and are liquid at normal temperature, having both characteristics of an alcohol and an ether, because they have an ether group and a hydroxyl group in their molecule.

Examples thereof include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, propylene glycol monomethyl ether, propylene glycol monoethyl ether, dipropylene glycol monomethyl ether, dipropylene glycol monoethyl ether and the like.

The ink composition of the invention can be prepared by a known conventional method. For example, first, the metallic pigment, a dispersant and the above-mentioned liquid medium are mixed, and then, a pigment dispersion is prepared by a ball mill, a bead mill, an ultrasonic wave, a jet mill or the like to adjust so as to have desired ink characteristics. Subsequently, the above-mentioned liquid medium, the nonionic surfactant, the binder resin and other additives (for example, a dispersing aid and a viscosity controlling agent) are added under stirring, thereby being able to obtain the pigment ink composition.

Besides, the composite pigment original is once subjected to ultrasonic treatment in a solvent to prepare a composite pigment dispersion, and then, it may be mixed with a necessary liquid medium for ink. Further, it is also possible to directly subject the composite pigment original to ultrasonic treatment to prepare the ink composition as such.

The physical properties of the ink composition of the invention are not particularly limited. However, for example, the surface tension thereof is preferably from 20 to 50 mN/m. When the surface tension decreases to less than 20 mN/m, the ink composition wetly spreads over a surface of a printer head for ink jet recording or exudes therefrom, resulting in difficulty of ejecting ink droplets in some cases. When the surface tension exceeds 50 mN/m, the ink composition does not wetly spread over a surface of a recording medium, resulting in failure to perform good printing in some cases.

In the ink composition according to the invention, the metallic pigment is preferably 2% by weight (wt %) or less based on the whole ink composition, because more stable print results can be obtained.

The ink composition of the invention can be applied to various ink jet recording systems. That is to say, it can be applied to various ink jet recording systems such as an electric field controlling system in which ink is ejected utilizing electrostatic attraction, a drop-on-demand system (or a pressure pulse system) in which ink is ejected utilizing driving pressure of a piezoelectric element, and further, a bubble or thermal system in which ink is ejected utilizing pressure developed by forming bubbles and allowing them to grow by high heat.

Further, in the ink jet recording method using the ink composition of the invention, it is preferred that an ink jet head having a nozzle diameter of 30 μm or less is used.

Furthermore, it is preferred that the ratio of the average particle size of the metallic pigment of the invention and the nozzle diameter of the ink jet nozzle (average particle size/nozzle diameter) is 0.15 or less.

EXAMPLES

The invention will be illustrated in greater detail with reference to the following examples, but the invention should not be construed as being limited thereby.

Example 1

1. Production of Aluminum Pigment Dispersion (1) A resin layer coating solution having the following composition was applied onto a 100 μm-thick PET film by spin coating to form a uniform liquid film, and then, dried to prepare a thin resin film layer.

| (Resin Layer Coating Solution) | |
|---|---|
| Polyvinyl Butyral Resin (Esreck BL-10 manufactured by Sekisui Chemical. Co., Ltd.) | 3.0% by weight |
| Glycerol | 2.0% by weight |
| IPA (Isopropyl Alcohol) | balance |

(2) On the above-mentioned resin layer, an aluminum vapor-deposited layer having a thickness of 70 nm was formed by using the following apparatus.

Apparatus: Vacuum depositing apparatus Model VE-1010, Shinkuu Device K.K.

(3) Separation, miniaturizing and dispersing treatments were concurrently performed on the PET film having a laminate of the resin layer and the aluminum vapor-deposited layer formed by the above-mentioned methods in IPA for 12 hours by using an ultrasonic disperser to produce a aluminum pigment dispersion (also referred to as a metallic pigment) having an accumulated time of dispersing treatment of 12 hours.

The pigment content of the aluminum pigment dispersion obtained by this method was 5.0% by weight.

Disperser: Ultrasonic washing machine VS-150 manufactured by As One Corporation (4) The above-mentioned metallic pigment IPA dispersion was allowed to stand for a whole day ad night, and coarse particles which had sedimented on the bottom of a vessel were removed, thereby performing classifying treatment.

Diethylene glycol diethyl ether was added to this metallic pigment IPA dispersion, and removal of IPA by distillation and concentration of the pigment were performed using a rotary evaporator.

After the concentration operation, the pigment concentration and the release resin concentration were determined using a thermal analysis instrument, and the concentration was adjusted so that the pigment concentration became 5% by weight. The concentration of polyvinyl butyral used as a release agent in that case was 2.5% by weight.

Such operations were conducted to prepare a metallic pigment diethylene glycol diethyl ether (DEGdEE) dispersion.

Thermal analysis instrument: EXSTAR6000TG/DTA6200 manufactured by Seiko Instruments Inc.

2. Evaluation of Particle Size and Particle Size Distribution

For the above-mentioned aluminum pigment dispersion, the particle size and the particle size distribution were measured using the following instrument. The results of evaluation are shown in Table 1.

Measurement of the particle size and particle size distribution: LMS-30 manufactured by Seishin Enterprise Co., Ltd.

3. Measurement of Average Thickness

For the measurement of the average thickness of the metallic pigment in the ink composition, the average thickness of 10 particles randomly selected from an electron micrographic image was measured, and evaluation was made by taking an average value thereof.

4. Preparation of Metallic Pigment-Containing Ink Composition

Using the aluminum pigment dispersion prepared by the above-mentioned method, metallic pigment-containing ink composition 1 was prepared so as to give the following composition. An additive was mixed with and dissolved in a solvent to prepare an ink solvent, and then, the pigment dispersion was added into the ink solvent, followed by further mixing and stirring at normal temperature for 30 minutes.

| (Metallic Pigment-Containing Ink Composition 1) | |
| --- | --- |
| Aluminum Pigment (solid content) | 1% by weight |
| Polypropylene Glycol (manufactured by Kanto Chemical Co., Ltd., triol type, average molecular weight: 300,) | 20% by weight |
| BYK-UV3500 (manufactured by BYK Chemie Japan KK) | 0.2% by weight |
| Diethylene Glycol Diethyl Ether | 60% by weight |
| Dipropylene Glycol Monomethyl Ether | 18.8% by weight |

5. Evaluation of Filterability

For the metallic pigment-containing ink composition after the mixing and stirring, filterability was evaluated using a stainless steel mesh filter having a filtering accuracy of 10 μm. The results of evaluation are shown in Table 1.

6. Evaluation of Record•Print Stability and Glossiness

Using an ink jet printer, EM-930C (nozzle diameter: 25 μm) manufactured by Seiko Epson Corporation, printing was performed on Photographic Paper <Gloss> (model number: KA450PSK) manufactured by said corporation, and it was confirmed that a printed surface having metallic luster was obtained.

7. Overall Evaluation

From the above-mentioned six results, judgment was made as follows:

A: It is possible to use in recording equipment of an ink jet system without problems.

B: It is difficult to use in recording equipment of an ink jet system.

C: It is judged that the use in recording equipment of an ink jet system is impossible.

Example 2

The same operation as in Example 1 was conducted. However, the accumulated time of dispersing treatment of 12 hours was prolonged to 18 hours to prepare metallic pigment-containing ink composition 2. The results of each evaluation similar to Example 1 are shown in Table 1.

Example 3

The same operation as in Example 1 was conducted. However, the accumulated time of dispersing treatment of 12 hours was prolonged to 24 hours to prepare metallic pigment-containing ink composition 3. The results of each evaluation similar to Example 1 are shown in Table 1.

Example 4

The same operation as in Example 1 was conducted. However, the accumulated time of dispersing treatment of 12 hours was prolonged to 72 hours to prepare metallic pigment-containing ink composition 4. The results of each evaluation similar to Example 1 are shown in Table 1.

Example 5

The same operation as in Example 1 was conducted. However, the time of dispersing treatment was prolonged to 18 hours, and the vapor deposition conditions were changed to form an aluminum vapor-deposited film having a thickness of 32 nm, thereby preparing metallic pigment-containing ink composition 5. The results of each evaluation similar to Example 1 are shown in Table 1.

Example 6

The same operation as in Example 1 was conducted. However, the time of dispersing treatment was prolonged to 18 hours, and the vapor deposition conditions were changed to form an aluminum vapor-deposited film having a thickness of 92 nm, thereby preparing metallic pigment-containing ink composition 6. The results of each evaluation similar to Example 1 are shown in Table 1.

Comparative Example 1

The same operation as in Example 1 was conducted. However, the accumulated time of dispersing treatment of 12 hours was shortened to 1 hour to prepare metallic pigment-containing ink composition 7. The results of each evaluation similar to Example 1 are shown in Table 1.

Comparative Example 2

The same operation as in Example 1 was conducted. However, the accumulated time of dispersing treatment of 12 hours was shortened to 10 hours to prepare metallic pigment-containing ink composition 9. The results of each evaluation similar to Example 1 are shown in Table 1.

Comparative Example 3

The same operation as in Example 1 was conducted. However, the time of dispersing treatment was prolonged to 18 hours, and the vapor deposition conditions were changed to form an aluminum vapor-deposited film having a thickness of 25 nm, thereby preparing metallic pigment-containing ink composition 9. The results of each evaluation similar to Example 1 are shown in Table 1.

Comparative Example 4

The same operation as in Example 1 was conducted. However, the time of dispersing treatment was prolonged to 18 hours, and the vapor deposition conditions were changed to form an aluminum vapor-deposited film having a thickness of 110 nm, thereby preparing metallic pigment-containing ink composition 10. The results of each evaluation similar to Example 1 are shown in Table 1.

TABLE 1

| | Accumulated Time of Dispersing Treatment | ×10 (μm) | ×50 (μm) | ×90 (μm) | $x_{max}$ (μm) | Ratio to Nozzle Diameter | Average Film Thickness (nm) | Filterability of 10-μm Filter | Possibility of Printing | Metallic Luster | Overall Judgment |
| --- | --- | --- | --- | --- | --- | --- | --- | --- | --- | --- | --- |
| Example 1 | 12 hr | 2.04 | 3.64 | 6.52 | 11.79 | 0.15 | 70 | Possible | Possible without problems | Good | A |
| Example 2 | 18 hr | 1.79 | 3.15 | 5.86 | 11.79 | 0.13 | 70 | Possible | Possible without problems | Good | A |

TABLE 1-continued

| | Accumulated Time of Dispersing Treatment | ×10 (μm) | ×50 (μm) | ×90 (μm) | $×_{max}$ (μm) | Ratio to Nozzle Diameter | Average Film Thickness (nm) | Filterability of 10-μm Filter | Possibility of Printing | Metallic Luster | Overall Judgment |
|---|---|---|---|---|---|---|---|---|---|---|---|
| Example 3 | 24 hr | 1.69 | 2.81 | 4.88 | 8.39 | 0.11 | 70 | Possible | Possible without problems | Good | A |
| Example 4 | 72 hr | 0.53 | 1.06 | 2.17 | 4.24 | 0.04 | 70 | Possible | Possible without problems | Good | A |
| Example 5 | 18 hr | 1.63 | 2.99 | 5.37 | 11.79 | 0.12 | 32 | Possible | Possible without problems | Good | A |
| Example 6 | 18 hr | 1.92 | 3.30 | 6.24 | 11.79 | 0.12 | 92 | Possible | Possible without problems | Good | A |
| Comparative Example 1 | 1 hr | 4.64 | 10.97 | 21.80 | 46.08 | 0.44 | 70 | Impossible | Impossible | — | C |
| Comparative Example 2 | 10 hr | 2.19 | 3.90 | 6.91 | 13.98 | 0.16 | 70 | Partially possible | Printing is difficult | Good | B |
| Comparative Example 3 | 18 hr | 1.62 | 2.97 | 5.32 | 11.79 | 0.12 | 25 | Possible | Possible without problems | Poor | C |
| Comparative Example 4 | 18 hr | 2.00 | 3.35 | 6.25 | 11.79 | 0.12 | 110 | Partially possible | Printing is difficult | Good | B |

Overall Judgment
A: It is possible to use in recording equipment of an ink jet system without particular problems.
B: It is difficult to use in recording equipment of an ink jet system.
C: It is judged that the use in recording equipment of an ink jet system is impossible.

In addition, ×10, ×50 and ×90 in the table show particle sizes at accumulated values from the small particle size side in the particle size distribution of 10%, 50% and 90%, respectively, and the average particle size as described herein is a numerical value of ×50. $×_{max}$ shows the maximum particle size in the particle size distribution.

As apparent from Table 1, the metallic pigments of respective Examples according to the invention each provided the results excellent in both print stability and glossiness to be satisfied. However, the metallic pigments of respective Comparative Examples in which the factor relating to the average particle size was outside the specified range was unsatisfactory as an ink jet ink composition.

Example 7

Ink composition 11 was prepared by the same operation as in Example 3 with the exception that the composition was as follows:

| | |
|---|---|
| Aluminum Pigment (solid content) | 1% by weight |
| Polyvinyl Butyral (manufactured by Sekisui Chemical. Co., Ltd., Esreck BL-10) | 3% by weight |
| Diethylene Glycol Diethyl Ether (manufactured by Nippon Nyukazai Co., Ltd.) | 40% by weight |
| Olfin E1010 (manufactured by Nissin Chemical Industry Co., Ltd.) | 0.5% by weight |
| Dipropylene Glycol Monomethyl Ether (manufactured by Nippon Nyukazai Co., Ltd.) | balance |

Example 8

Ink composition 12 was prepared by the same operation as in Example 7 with the exception that the composition was as follows:

| | |
|---|---|
| Aluminum Pigment (solid content) | 1% by weight |
| Cellulose Acetate Butyral (manufactured by Kanto Chemical Co., Ltd., average molecular weight: 16,000, butylated ratio: 50 to 54%) | 4% by weight |
| Diethylene Glycol Diethyl Ether (manufactured by Nippon Nyukazai Co., Ltd.) | 40% by weight |
| Olfin E1010 (manufactured by Nissin Chemical Industry Co., Ltd.) | 0.5% by weight |
| Dipropylene Glycol Monomethyl Ether (manufactured by Nippon Nyukazai Co., Ltd.) | balance |

Example 9

Ink composition 13 was prepared by the same operation as in Example 7 with the exception that the composition was as follows:

| | |
|---|---|
| Aluminum Pigment (solid content) | 1% by weight |
| Cellulose Acetate Butyral (manufactured by Kanto Chemical Co., Ltd., average molecular weight: 16,000, butylated ratio: 50 to 54%) | 4% by weight |
| Diethylene Glycol Diethyl Ether (manufactured by Nippon Nyukazai Co., Ltd.) | 40% by weight |
| BYK-UV3500 (manufactured by BYK-Chemie Japan KK) | 0.2% by weight |
| Dipropylene Glycol Monomethyl Ether (manufactured by Nippon Nyukazai Co., Ltd.) | balance |

[Measurement of Specular Gloss Based on Japanese Industrial Standards]

Using EM-930C (nozzle diameter: ϕ25 μm) manufactured by Seiko Epson Corporation, ink composition 3 (Example 3), Ink composition 11 (Example 7), Ink composition 12 (Example 8), Ink composition 13 (Example 9) and Ink composition 10 (Comparative Example 4) were recorded (solid printed) on Photographic Paper (Gloss: KA450PSK) manufactured by said corporation. For the recorded matter, evaluation of glossiness at 20° and 60° was performed using a grossmeter, MULTIGLOSS 268, manufactured by Konica Minolta Corporation by a method based on JIS Z 8741 (1997). The results thereof are shown below.

TABLE 2

| Evaluation Results of Glossiness | | |
|---|---|---|
| | 20° | 60° |
| Example 3 | 295 | 350 |
| Example 7 | 310 | 342 |
| Example 8 | 377 | 416 |
| Example 9 | 383 | 410 |
| Comparative Example 3 | 114 | 122 |

As apparent from Table 2, it was confirmed that the ink compositions of respective Examples according to the invention provided recorded surfaces having excellent metallic luster, compared to the ink compositions of Comparative Examples.

Example 10

Ink composition 14 was prepared by the same operation as in Example 1 with the exceptions that the release resin was changed to cellulose acetate butyrate and that a fixing resin emulsion N-2043-AF-1 was post-added, according to the following composition:

| | |
|---|---|
| Aluminum Pigment (as a solid content) | 1% by weight |
| Polypropylene Glycol (manufactured by Kanto Chemical Co., Ltd., triol type, average molecular weight: 300) | 10% by weight |
| N-2043-AF-1 (manufactured by Harima (Chemicals Inc., nonaqueous acrylic polyol emulsion, solid concentration: 60%) | 4% by weight |
| BYK-UV3500 (manufactured by BYK Chemie Japan KK) | 0.2% by weight |
| Diethylene Glycol Diethyl Ether | 66% by weight |
| Dipropylene Glycol Monomethyl Ether | 18.8% by weight |

Example 11

Ink composition 15 was prepared by the same operation as in Example 10 with the exception that the solvent composition ratio was changed, according to the following composition:

| | |
|---|---|
| Aluminum Pigment (as a solid content) | 1% by weight |
| Polypropylene Glycol (manufactured by Kanto Chemical Co., Ltd., triol type, average molecular weight: 300) | 10% by weight |
| N-2043-AF-1 (manufactured by Harima Chemicals Inc., nonaqueous acrylic polyol emulsion, solid concentration: 60%) | 4% by weight |
| BYK-UV3500 (manufactured by BYK Chemie Japan KK) | 0.2% by weight |
| Diethylene Glycol Diethyl Ether | 18% by weight |
| Dipropylene Glycol Monomethyl Ether | 66.8% by weight |

Example 12

Ink composition 16 was prepared by the same operation as in Example 11 with the exception that the solvent composition ratio was changed, according to the following composition:

| | |
|---|---|
| Aluminum Pigment (as a solid content) | 1% by weight |
| Polypropylene Glycol (manufactured by Kanto Chemical Co., Ltd., triol type, average molecular weight: 300) | 10% by weight |
| N-2043-AF-1 (manufactured by Harima Chemicals Inc., nonaqueous acrylic polyol emulsion, solid concentration: 60%) | 4% by weight |
| BYK-UV3500 (manufactured by BYK Chemie Japan KK) | 0.2% by weight |
| Diethylene Glycol Diethyl Ether | 70% by weight |
| Dipropylene Glycol Monomethyl Ether | 14.8% by weight |

The fixability and specular gloss of the above-mentioned ink compositions 14 to 16 (Examples 10 to 12) were evaluated.

The specular gloss was evaluated in the same manner as in Example 3 described above and the like.

The fixability was evaluated by the following indexes:

Fixability Evaluation Indexes

A: The metallic pigment is not separated even when rubbed several times with a finger.

B: The separation of the metallic pigment is somewhat observed when it is rubbed several times with a finger.

C: The metallic pigment is almost separated from a recording medium when rubbed with a finger.

The evaluation results of the fixability and specular gloss are shown in the following Table 3.

TABLE 3

| | Amount of Release Resin in Ink (wt %) | Amount of Fixing Resin (wt %) | Solvent Ratio | Fix- ability | Gloss 20° | 60° |
|---|---|---|---|---|---|---|
| Example 10 | 0.5 | 2.4 | 78:22 | A | 416 | 421 |
| Example 11 | 0.5 | 2.4 | 21:79 | A | 365 | 407 |
| Example 12 | 0.5 | 2.4 | 83:17 | A | 230 | 405 |

Solvent ratio: Diethylene glycol diethyl ether/dipropylene glycol monomethyl ether ratio Examples 11 and 12, in which the diethylene glycol diethyl ether:dipropylene glycol monomethyl ether ratio of the organic solvents used was within the range of 20:80 to 80:20, were more excellent in gloss than Example 12 in which the organic solvent outside the range was used. However, Table 2 shows that Example 12 in which the diethylene glycol diethyl ether:dipropylene glycol monomethyl ether ratio of the organic solvent used was outside the range of 20:80 to 80:20 was also more excellent in gloss than Comparative Example 3.

Further, using ink composition 14 and using an ink jet printer, EM-930C manufactured by Seiko Epson Corporation, printing was performed on Viewcal 2000 (manufactured by Sakurai Co., Ltd., white, product number: VC2000) and Viewcal 900 (manufactured by Sakurai Co., Ltd., white, product number: VC900), and it was confirmed that a metallic luster surface excellent in fixability and gloss was obtained.

The invention claimed is:

1. An ink jet recording method comprising ejecting a metallic pigment ink composition from an ink jet head having a nozzle diameter of 30 μm or less,
   wherein the metallic pigment ink composition comprises at least a pigment dispersion containing a metallic pigment for inkjet printing, which comprises metal foil pieces having an average thickness of 30 to 92 nm and has a 50% average particle size of 1.0 μm to 4.0 μm and a maximum particle size of 12 μm or less, and wherein the ratio of the 50% average particle size of the metallic pigment and the nozzle diameter of the ink jet head (average particle size/nozzle diameter) is 0.15 or less.

2. The ink jet recording method according to claim 1, wherein the metal foil pieces are obtained by separating a metal or metal compound layer of a pigment original having a structure in which a release resin layer and the metal or metal compound layer are sequentially laminated on a sheet-shaped base material, from the sheet-shaped base material at an interface between the metal or metal compound layer and the sheet-shaped base material as a boundary, followed by pulverization.

3. The ink jet recording method according to claim 2, wherein the metal or metal compound layer is prepared by a vacuum deposition method.

4. The ink jet recording method according to claim 2, wherein the pulverizing treatment and dispersing treatment are performed with no medium.

5. The ink jet recording method according to claim 4, wherein the pulverizing treatment and dispersing treatment are performed by any one or more of ultrasonic dispersion, a jet mill and a colloid mill.

6. The ink jet recording method according to claim 4, wherein classifying treatment is performed after the pulverizing treatment and dispersing treatment.

7. The ink jet recording method according to claim 6, wherein the classifying treatment is performed by centrifugal classification, sedimentation classification or screen classification.

8. The ink jet recording method according to claim 1, wherein the pigment dispersion further contains a release resin dissolved and an alkylene glycol ether.

9. The ink jet recording method according to claim 8, wherein the release resin is polyvinyl butyral or cellulose acetate butyrate.

10. The ink jet recording method according to claim 1, wherein the alkylene glycol ether is liquid under normal temperature and pressure, the alkylene group is an ethylene group or propylene group of 2 to 4 repeating units, and the ether group is a monoether and/or a diether.

11. The ink jet recording method according to claim 1, wherein the metallic pigment ink composition further comprises an organic solvent.

12. The ink jet recording method according to claim 11, wherein the organic solvent is liquid under normal temperature and pressure, the alkylene group of the alkylene glycol ether is an ethylene group or propylene group of 2 to 4 repeating units, the ether group is a mixture of a monoether and/or a diether, and an acrylic polyol resin is contained as a fixing resin.

13. The ink jet recording method according to claim 12, wherein the organic solvent comprises diethylene glycol diethyl ether and dipropylene glycol monomethyl ether.

14. The ink jet recording method according to claim 13, wherein the mixing ratio of the diethylene glycol diethyl ether and the dipropylene glycol monomethyl ether in the organic solvent ranges from 20:80 to 80:20.

15. The ink jet recording method according to claim 14, wherein the metallic pigment ink composition contains a silicone-based surfactant, a polyoxyethylene-based surfactant or an acetylenediol-based surfactant.

16. The ink jet recording method according to claim 15, wherein the metallic pigment ink composition further contains polyvinyl butyral and/or cellulose acetate butyrate.

17. Printed matter which is obtained by the ink jet recording method according to claim 1.

18. An ink jet recording method comprising ejecting a metallic pigment ink composition from an ink jet head having a nozzle diameter of 30 μm or less, wherein the metallic pigment ink composition comprises at least a pigment dispersion containing a metallic pigment for inkjet printing, which comprises metal foil pieces comprising a metal having metallic luster and having an average thickness of 32 to 92 nm and has a 50% average particle size of 1 μm to 4 μm and a maximum particle size of 12 μm or less, and wherein the ratio of the 50% average particle size of the metallic pigment and the nozzle diameter of the ink jet head (average particle size/nozzle diameter) is 0.15 or less.

* * * * *